UNITED STATES PATENT OFFICE 2,134,247

ETHERIFIED DERIVATIVES OF PENTAHYDROXY-FUCHSONE AND PROCESS FOR THEIR PRODUCTION

Zoltán Földi, Budapest, Hungary

No Drawing. Application February 23, 1937, Serial No. 127,319. In Hungary May 18, 1936

12 Claims. (Cl. 260—386)

The preparation of the polyhydroxy fuchsones has been the subject of several investigations without having led to crystalline or pure forms of these derivatives in general. The partially etherified polyhydroxy fuchsones which contain ortho hydroxy and alkoxy groups in each of the three benzene rings having heretofore been unknown. Experiments have now led to the unexpected result that these fuchsones, readily crystallize and are, consequently, obtained in pure crystalline state.

The main object of my invention is to produce etherified derivatives of pentahydroxy-fuchsone represented by the following formula

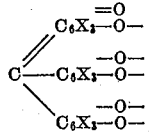

in which formula X represents any member of the group: H, alkyl, halogens, sulpho group,— the free valences in the formula being linked to hydrogen or an aliphatic radical, with the restriction that at least one of the phenolic oxygen atoms is attached to an aliphatic radical,—the quinonic and phenolic oxygen atoms being in mutual ortho position on the benzene rings.

According to my present invention such new products can be prepared by oxidizing leuko triphenylmethane derivatives of the general formula

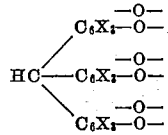

in which formula X represents any member of the group: H, alkyl, halogens, sulpho group,—the phenolic oxygen-atoms being in mutual ortho position on the benzene rings and linked to H or an aliphatic radical, at least one of the phenolic oxygen atoms being linked to an aliphatic radical.

Further aims of the inventions are disclosed in the following specification and claims.

The oxidation of the leuko derivative may also be effected simultaneously with the formation of this leuko derivative. In this case the condensation commonly used for the preparation of leuko triphenylmethanes is effected in the presence of an oxidizing agent. In some cases the addition of a pronounced oxidant can be avoided if either one of the starting materials or the condensing agent used for the synthesis is capable of effecting the oxidation.

For an oxidative condensation, as well as for the oxidation of leuko derivatives isolated in pure state, nitrites have been found to be especially suitable as oxidizing agents, especially the organic nitrites such as e. g. amyl nitrite; if however starting materials contain many phenolic hydroxy groups, organic peroxides are to be preferred. When oxidizing either by organic nitrites or by organic peroxides, ethyl acetate or similar esters can be used as solvents. For the isolation of the quinonic derivatives from the reaction mixture, the addition compounds formed with acids, particularly with hydracids, are very useful.

Of the synthetic methods usually employed for preparing triphenylmethanes, that one is especially suitable which employs as starting material, on the one hand, catechol aldehyde or its mono or dialkyl ether and, on the other hand, catechol or its alkyl ethers which starting materials may also be substituted in their benzene rings by alkyl, halogen or sulpho groups. The methane carbon atom of the desired triphenylmethane derivatives can also be supplied by e. g. a polyhalide of methane such as iodoform, carbon tetrabromide, and so on.

In order to effect an oxidative condensation, acid condensing agents are used in general, such as e. g. concentrated sulphuric acid diluted by alcohol or glacial acetic acid, or anhydrous hydrogen chloride dissolved in absolute alcohol or in ethyl acetate. Dehydrating salts, e. g. zinc chloride, or similar substances may also be employed. However, the employment of such condensing agents is not necessary in every case. So e. g. in the case carbon polyhalides, as iodoform, are used, the application of condensing agents is superfluous.

One may start also with triphenylmethanes containing in each benzene ring two alkoxy groups in mutual ortho position, transforming in this case one alkoxy group into the quinonic oxygen radical. Transformations of this kind can be effected e. g. by treatment with phosphorus pentachloride or by oxidizing one of the methyl groups, suitably by chromic acid.

The fuchsones obtained by the present process are apt to form addition products e. g. with acids or bases, with a great number of metallic salts, with bisulphites and with compounds containing hydroxy group. The fuchsones can be easily regenerated from these addition products.

The products of this process are valuable intermediates partly for the dye-stuff industry partly for the pharmaceutical industry; they also have valuable therapeutic as e. g. antiseptic properties; they exhibit further curative action with certain forms of tuberculosis.

*Examples*

1. 50 g. of 3,3',4,4',4''-pentahydroxy-3''-monomethoxy-triphenylmethane (obtained by condensation of vanilline and catechol; m. p. 195–198°) and 35 g. of benzoyl peroxide are dissolved in 300 cc. of ethyl acetate and, while cooling by ice, saturated with dry hydrogen chloride. After being allowed to stand for 2 days, the solution is evaporated under diminished pressure until a sirupy consistency is reached and, before any crystallization can take place, shaken with 80 cc. of a 20% sodium bisulphite solution for 30 minutes; after ether has been added, the bisulphite layer is separated. The ethereal layer is again extracted repeatedly with 30, 15, 15 cc. of sodium bisulphite solutions. The united bisulphite extracts are acidified with about 50 cc. of concentrated hydrochloric acid. After standing for 12 hrs., the hydrochloride of the m-methoxy-m-dihydroxy-p-dihydroxy-fuchsone separates. This is filtered off, washed with a 10% hydrogen chloride solution and dried at diminished pressure. The crude yield amounts to 22–26 g. For recrystallization warm acetone is used to which, after filtration, carbon tetrachloride is added until slight turbidity. In course of a few days the hydrochloride separates in form of dark crystals which show a metallic lustre. Decomposition occurs at about 165–170°. The color of the aqueous alcoholic solution is vivid red; it turns blue on addition of alkali. The alkaline solutions are readily oxidized by air.

2. 50 g. of 3,3',4,4',4''-pentahydroxy-3''-monomethoxy-triphenylmethane and 35 g. of benzoyl peroxide are dissolved in 250 g. of ethyl acetate and saturated with dry hydrogen chloride under cooling by ice. After standing for 20 hrs. the solution is evaporated under diminished pressure and the residue mixed with a small quantity of ethyl acetate containing 12% of dry hydrogen chloride. On standing, slow crystallization takes place. The crystals filtered off are shaken with a 10% solution of sodium acetate and with ethyl acetate. The ethyl acetate layer is separated and evaporated. The residue is taken up by a small quantity of absolute alcohol and mixed with diethyl amine. On addition of ether, the addition compound of the tetrahydroxy-monomethoxy fuchsone formed with diethyl amine separates as dark blue granulae. This product is readily soluble in water.

3. The process employed is essentially identical with the one described in Example 1, the difference being however that the product, obtained by recrystallization from acetone, is triturated on the steam-bath with about 100 cc. of water and 30 cc. of a 20% sodium acetate solution while stirring mechanically. The reaction mixture is extracted with ethyl acetate, the ethyl acetate layer is separated, dried with anhydrous sodium sulphate, concentrated to about 70 cc. and mixed while still warm with 45 cc. of chloroform. On standing, dark crystals of the tetrahydroxy-monomethoxy fuchsone deposit. Decomposition takes place at about 119° C. The free fuchsone is readily soluble in alcohol, acetone, ethyl acetate, and ether, and is sparingly soluble in benzene, chloroform, and carbon tetrachloride.

4. 32 g. of benzoyl-peroxide are dissolved in 400 cc. of ethyl acetate and 44 g. of 3,3'-dimethoxy-3'',4,4',4''-tetrahydroxy-triphenylmethane added. The mixture is cooled in ice and saturated with dry hydrogen chloride. After being kept standing for several days with frequent occasional shaking, the solution deposits dark crystals of the m-hydroxy-m-dimethoxy-p-dihydroxy-fuchsone hydrochloride. Yield: 25–30 g. Decomposition occurs at about 172–180°. The product, dissolved in aqueous alcohol, is of a deep red color which turns blue on addition of alkali. It forms dark blue salts with aluminium hydroxide, zinc oxide, lead acetate, etc.

5. 22 parts of 3,3',3''-trimethoxy-4,4',4''-trihydroxy-triphenylmethane are suspended in 45 parts of ethyl acetate and 14 parts of ethyl acetate, containing 16% dry hydrogen chloride, are added. On addition of 8.9 parts of amyl nitrite (of 75% purity) in small quantities, at a temperature not exceeding 20° C., and after 2 days of subsequent standing, the metallic crystals of the 3,3',3''-trimethoxy 4,4'-dihydroxy-fuchsone hydrochloride are filtered off. Yield: nearly theoretical. Decomposition occurs at about 218°. The product, dissolved in aqueous alcohol, is of a deep red color which turns violet on addition of alkali. The preparation of the free fuchsone, by adequate treatment of the hydrochloride, can be carried out as described in the foregoing example. The decomposition of the free fuchsone takes place at 250–251° C.

This compound can be recrystallized from hot chloroform, yielding dark blue, iridescent crystals containing crystal-chloroform.

6. 5 parts of guaiacol and 3 parts of vanillin are dissolved in 20 parts of an 11% solution of dry hydrogen chloride in ethyl acetate. After adding 3.6 parts of amyl nitrite the resulting solution is saturated with dry hydrogen chloride. After standing for 16–30 hrs. the dark crystals of the 3,3',3''-trimethoxy-4,4'-dihydroxy-fuchsone hydrochloride are filtered off. Yield: 55–70%.

The product is identical with that described in Example 5.

7. A mixture of 15 g. of piperonal, 25 g. of guaiacol and 100 cc. of hydrochloric acid is stirred for 14 hrs. After forming a temporarily clear solution, the condensation product separates and, after having been washed, is subsequently subjected to steam-distillation in order to remove any unchanged guaiacol. The crude product is dissolved in 90 cc. ethyl acetate and dried with anhydrous sodium sulphate. On addition of 12 cc. of amyl nitrite and 30 cc. of ethyl acetate containing 11.5% dry hydrogen chloride, the hydrochloride of the 3,3'-dimethoxy-3'',4''-methylene-dioxy-4'-hydroxy fuchsone crystallizes soon. After standing for 12–20 hrs. it is filtered off. Yield: 30 g. Decomposition occurs at about 162°. The product displays the same dyeing properties as described for the product of the foregoing example.

8. 5 parts of guaiacol and 2.8 parts of catechol aldehyde are dissolved in 20 parts of ethyl acetate containing 11% dry hydrogen chloride. On adding 7 parts of benzoyl peroxide (representing 5.2% active oxygen) the mixture is saturated with dry hydrogen chloride, while stirring and cooling. The benzoyl peroxide passes into solution after some time; the mixture is then diluted with 60 parts of ethyl acetate. On further standing the hydrochloride of the m-hydroxy-p-hydroxy-m-dimethoxy-fuchsone separates in form of dark crystals which have a metallic lustre.

The product is identical with that described in Example 4.

9. 100 g. of 3,3',3''-trimethoxy-4,4',4''-trihydroxy-triphenylmethane are dissolved in 800 cc. of absolute alcohol followed by addition of 40 g. of amyl nitrite and, subsequently, of 50 cc. of absolute alcohol containing 30% dry hydrogen chloride. The solution is kept standing for several hours after which heating is applied for a short time. On cooling crystals are deposited which are filtered and triturated with 500 cc. of a 10% sodium acetate solution while stirring mechanically. The resulting product is removed by filtration, washed with water and, after addition of 75 g. of a 40% sodium bisulphite solution and of 120 cc. of water, kept in a waterbath of 80° until completely dissolved. Colorless or slightly colored crystals of the sodium bisulphite addition compound of the dihydroxy-trimethoxy fuchsone separate from the filtered hot solution. Yield: 75-90 g. The compound is moderately soluble in cold water. The aqueous solution is of a vivid red color which turns violet on addition of alkali. The sodium bisulphite compound yields on dissolving in water and adding an excess of aqueous hydrogen chloride a thick crystal mass of the fuchsone hydrochloride.

The sodium bisulphite addition compound of the dimethoxy-trihydroxy-fuchsone is obtained in exactly the same way and the solubilities of this compound are also much the same.

Also, the sodium bisulphite addition compound of the monomethoxy-tetrahydroxy-fuchsone can be prepared in this way. It must be noted however that this latter substance is very readily soluble even in cold water.

10. The same process is employed as described in the foregoing example the difference being, however, that 1 part of the product obtained after trituration with sodium acetate, filtration and drying, is dissolved in 10 parts of absolute alcohol and 1 part of 70% aqueous hydroiodic acid added. On standing for some time, the iodohydrate of the 3,3',3''-trimethoxy-4,4'-dihydroxy-fuchsone separates. Decomposition takes place at about 215°.

11. 10 parts of 3,3',3'',4,4',4''-hexamethoxy-triphenylmethane (prepared according to Chemisches Zentralblatt, 1935, II, page 3659) are dissolved in 50 parts of glacial acetic acid. Subsequently, a solution of 6 parts of chromic acid in 60 parts of a 50% aqueous acetic acid is added by lots. Development of heat follows, and in a short time, the chromic acid is entirely used up. The mixture is, after being diluted with water, extracted thoroughly with ether, the ethereal layer being subsequently separated and evaporated. The residue is dissolved in a small quantity of ethyl acetate, and ethyl acetate saturated with dry hydrogen chloride is added. The solution deposits readily a dark red crystal mass of the 3,3',3'',4,4,4'-pentamethoxy fuchsone hydrochloride. Decomposition takes place at about 115-120°. When a suspension in water is made from the product, the free fuchsone can be obtained by treatment with sodium bicarbonate. This latter substance crystallizes from ethyl acetate on addition of petrol ether in the form of slightly colored thick crystals of m. p. 140°. The pentamethoxy fuchsone gives red coloration when dilute inorganic acids are added; on addition of alkali, the solution becomes colorless.

12. 10 parts of 3,3',3'',4,4'-pentamethoxy-4''-hydroxy-triphenylmethane (obtainable by condensing vanilline and veratrol; M. P. 140°) and 6 parts of amyl nitrite, dissolved in ethyl acetate which contains hydrogen chloride, give, on following the method described in Example 5, the pentamethoxy fuchsone hydrochloride described in Example 11.

13. 20 g. of 3,3',3''-trimethoxy-4,4',4''-trihydroxy-5-bromotriphenylmethane (obtainable by condensing 5-bromo-vanilline and guaiacol; melting point, after recrystallization from chloroform, 110-113°) are dissolved in 50 cc. of ethyl acetate, 5 cc. of amyl nitrite and 20 cc. of ethyl acetate saturated with dry hydrogen chloride are added. On standing for two days in the dark, iridescent crystals of m-trimethoxy-p-dihydroxy-m-bromo-fuchsone hydrochloride separate. Yield 80-90%. Decomposition takes place at about 186°.

14. 1 part of iodoform and 1.2 parts of guaiacol are heated to 105-115° C. for 40-60 hrs. until the formation of methyl iodide practically ceases. At this point, the volatile products are removed by distillation from a boiling water bath at 1 mm. mercury pressure. The product thus obtained is dissolved in sodium carbonate, the insoluble residue removed by filtration and the filtrate acidified with acetic acid. A precipitate is formed, which is extracted repeatedly with a 10% aqueous sodium bisulphite solution. The united extracts are acidified with hydrochloric acid and, in order to remove all sulphur dioxide, boiled. Sodium acetate is then added in order to neutralize excess of the hydrochloric acid and the resulting mixture is extracted several times with ethyl acetate. The ethyl acetate solutions are united, concentrated and, subsequently, saturated with dry hydrogen chloride. After standing for several days, the hydrochloride of the trimethoxy-dihydroxy fuchsone—accompanied by hydrochlorides of other fuchsones containing less methoxy groups—separates in form of thick crystal crops showing a metallic lustre. This crude hydrochloride is dissolved in methyl alcohol and chromatographed by means of a glass tube filled with aluminium oxide sec. Brockmann. On elution with methyl alcohol or water 3,3',3''-trimethoxy-4,4'-dihydroxy-fuchsone passes into solution from which it can be isolated in crystalline form.

15. 3.4 g. of the calcium salt of 3,3',3''-trimethoxy-4,4',4''-trihydroxy-triphenylmethane-5-sulphonic acid (obtained by condensing 3-methoxy-4-hydroxy-benzaldehyde-5-sulphonic acid and guaiacol) are suspended in 22 cc. of absolute alcohol containing 0.6 g. of dry hydrogen chloride, and 0.8 cc. of amyl nitrite are added. The color of the mixture turns into deep red. It is allowed to stand for three days employing occasional shaking. On addition of 100 cc. of ether the calcium salt of m-trimethoxy-p-dihydroxy-fuchsone-m-sulphonic acid precipitates in form of a red powder. After being dried over phosphorus pentoxide, 3.4 g. are obtained. In order to purify, it can be recrystallized from hot water, dark, iridescent crystals of the calcium salt of the fuchsone-sulphonic acid separating on cooling. The product does not melt up to 280°.

The same product can be obtained by direct interaction of a calcium salt of 3-methoxy-4-hydroxy-benzaldehyde-5-sulphonic acid with guaiacol and of amyl nitrite.

In the present description and claims, the expression "alkyls substituted into phenolic hydroxyls" is intended to cover not only alkyls proper but also alkylenes, such as methylene, cyclically substituted into two adjacent hydroxyls.

What I claim is:

1. A process for preparing ethers of pentaoxy fuchsone comprising oxydizing leuko triphenyl-methane derivatives of the general formula

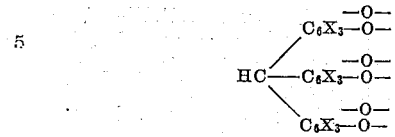

in which formula X represents any member of the group consisting of H, alkyl, halogen and sulpho,—the phenolic oxygen-atoms being in mutual ortho position on the benzene rings and linked to a member of the group consisting of H and an aliphatic radical, at least one of the phenolic oxygen atoms being linked to an aliphatic radical.

2. A process as claimed in claim 1, characterized by performing the oxidation of the leuko-triphenyl-methane derivative simultaneously with its formation from the starting compounds.

3. A process as claimed in claim 1, characterized by isolating the fuchsones in form of their addition products with a member of the group consisting of inorganic acids and alkali bisulphites.

4. A process as claimed in claim 1, characterized by performing the oxidation with a member of the group consisting of organic nitrites and organic peroxides.

5. A process as claimed in claim 1, characterized by performing the oxidation with amyl nitrite.

6. A process as claimed in claim 1, characterized by condensing in the presence of an oxidizing agent a compound of the type of protocatechu aldehyde with a compound of the type of catechol.

7. A process as claimed in claim 1, characterized by oxidizing trialkoxy-trihydroxy-triphenylmethane.

8. A triphenylmethane derivative of the following general formula

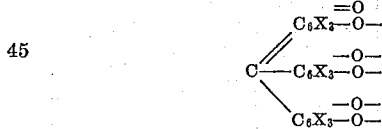

in which formula X represents any member of the group consisting of H, alkyl, halogen and sulpho,—the free valences in the formula being linked to a member of the group consisting of hydrogen and an aliphatic radical, with the restriction that at least one of the phenolic oxygen atoms is attached to an aliphatic radical,—the quinonic and phenolic oxygen atoms being in mutual ortho position on the benzene rings.

9. A triphenylmethan derivative of the following general formula

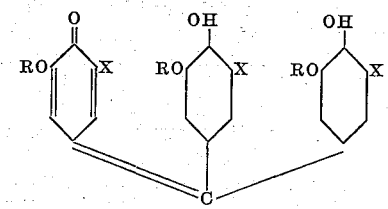

X representing a member of the group consisting of H, alkyl, halogen, and sulpho, and R representing a member of the group consisting of hydrogen and an alkyl group, with the restriction however that at least one R represents an alkyl group.

10. The 3,3',3'' - trimethoxy - 4,4' - dihydroxy-fuchsone, being a crystalline compound of red color, melting at 251–254° C.

11. A triphenylmethane derivative of the following general formula

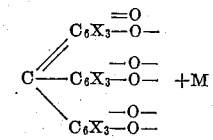

in which formula M represents a member of the group consisting of inorganic acids and bisulphites, X represents any member of the group consisting of H, alkyl, halogen, and sulpho, the free valences in the formula being linked to a member of the group consisting of hydrogen and an aliphatic radical, with the restriction that at least one of the phenolic oxygen atoms is attached to an aliphatic radical, the quinonic and phenolic oxygen-atoms being in mutual ortho position on the benzene rings.

12. As a new product, a triphenylmethane derivative of the following general formula

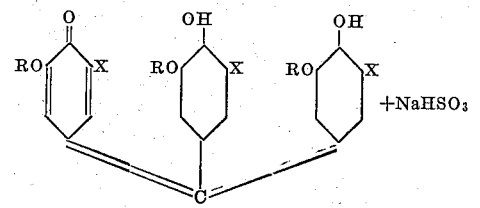

X representing a member of the group consisting of H, alkyl, halogen, and sulpho, R representing a member of the group consisting of hydrogen and an alkyl group, with the restriction however that at least one R represents an alkyl group.

ZOLTÁN FÖLDI.